US012473989B2

(12) United States Patent
Mason

(10) Patent No.: US 12,473,989 B2
(45) Date of Patent: Nov. 18, 2025

(54) SERVICEABLE SWING CHECK VALVE WITH INTEGRATED STRAINER AND REMOVABLE DRAIN

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 9 days.

(21) Appl. No.: 18/234,143

(22) Filed: Aug. 15, 2023

(65) Prior Publication Data
US 2025/0060046 A1 Feb. 20, 2025

(51) Int. Cl.
F16K 27/02 (2006.01)

(52) U.S. Cl.
CPC .................. F16K 27/02 (2013.01)

(58) Field of Classification Search
CPC .. F16K 27/02; F16K 27/0209; F16K 15/1848; F16K 15/03; F16K 15/184; Y10T 137/86292; Y10T 137/863; Y10T 137/877; Y10T 137/87877
USPC ........................................................ 137/584
See application file for complete search history.

(56) References Cited

U.S. PATENT DOCUMENTS

| | | | | |
|---|---|---|---|---|
| 4,478,617 A | * | 10/1984 | Rees | B60T 17/04 55/482 |
| 4,745,943 A | * | 5/1988 | Mortensen | F16T 1/34 138/44 |
| 5,467,796 A | * | 11/1995 | Pettinaroli | F16K 27/067 137/238 |
| 5,551,479 A | * | 9/1996 | Graves | F16K 5/0636 251/315.12 |
| 5,632,300 A | | 5/1997 | Isringhausen | |
| 5,948,128 A | * | 9/1999 | Stavropoulos | F16T 1/34 138/44 |
| 8,316,886 B2 | | 11/2012 | Olsen et al. | |
| 9,345,994 B2 | | 5/2016 | Morris | |
| 10,317,097 B2 | | 6/2019 | Karamanos | |
| 10,458,662 B2 | | 10/2019 | Olsen et al. | |
| 11,788,684 B1 | * | 10/2023 | Stavropoulos | F16T 1/34 137/177 |
| 11,802,625 B2 | * | 10/2023 | Terry | B01D 46/0017 |
| 2010/0319795 A1 | * | 12/2010 | Olsen | F24D 3/105 137/597 |

(Continued)

FOREIGN PATENT DOCUMENTS

| | | |
|---|---|---|
| CN | 208049492 | 11/2018 |
| EP | 1681520 | 7/2006 |

(Continued)

OTHER PUBLICATIONS

Henry Technologies, Product Catalog, www.henrytech.com (Apr. 2018).

(Continued)

Primary Examiner — Jessica Cahill
(74) Attorney, Agent, or Firm — PRICE HENEVELD LLP

(57) ABSTRACT

A serviceable swing check valve assembly includes an access port for servicing the swing check valve. The valve assembly also includes a strainer that strains the fluid before it reaches the swing check valve. A valve assembly is positioned adjacent to a drain port to drain the debris that is collected by the strainer.

19 Claims, 15 Drawing Sheets

(56) References Cited

U.S. PATENT DOCUMENTS

| | | | |
|---|---|---|---|
| 2011/0140015 A1* | 6/2011 | Parsons | F16K 35/02 |
| | | | 251/89 |
| 2012/0138171 A1* | 6/2012 | Coolens | F16K 15/148 |
| | | | 137/511 |
| 2014/0261848 A1* | 9/2014 | Roden | F16L 41/03 |
| | | | 251/315.01 |
| 2016/0178076 A1* | 6/2016 | Cellemme | F16K 15/063 |
| | | | 137/512 |
| 2023/0166145 A1* | 6/2023 | Williams | F16K 17/048 |
| | | | 169/16 |

FOREIGN PATENT DOCUMENTS

| | | | | |
|---|---|---|---|---|
| GB | 2230587 A | * | 10/1990 | E03C 1/106 |
| JP | 3014633 | | 8/1995 | |
| KR | 20030015169 | | 2/2003 | |

OTHER PUBLICATIONS

Johnson Controls, "PP1 Series Piping Packages for VG1000 Series Ball Valves," Product Bulletin (Jan. 2020).

* cited by examiner

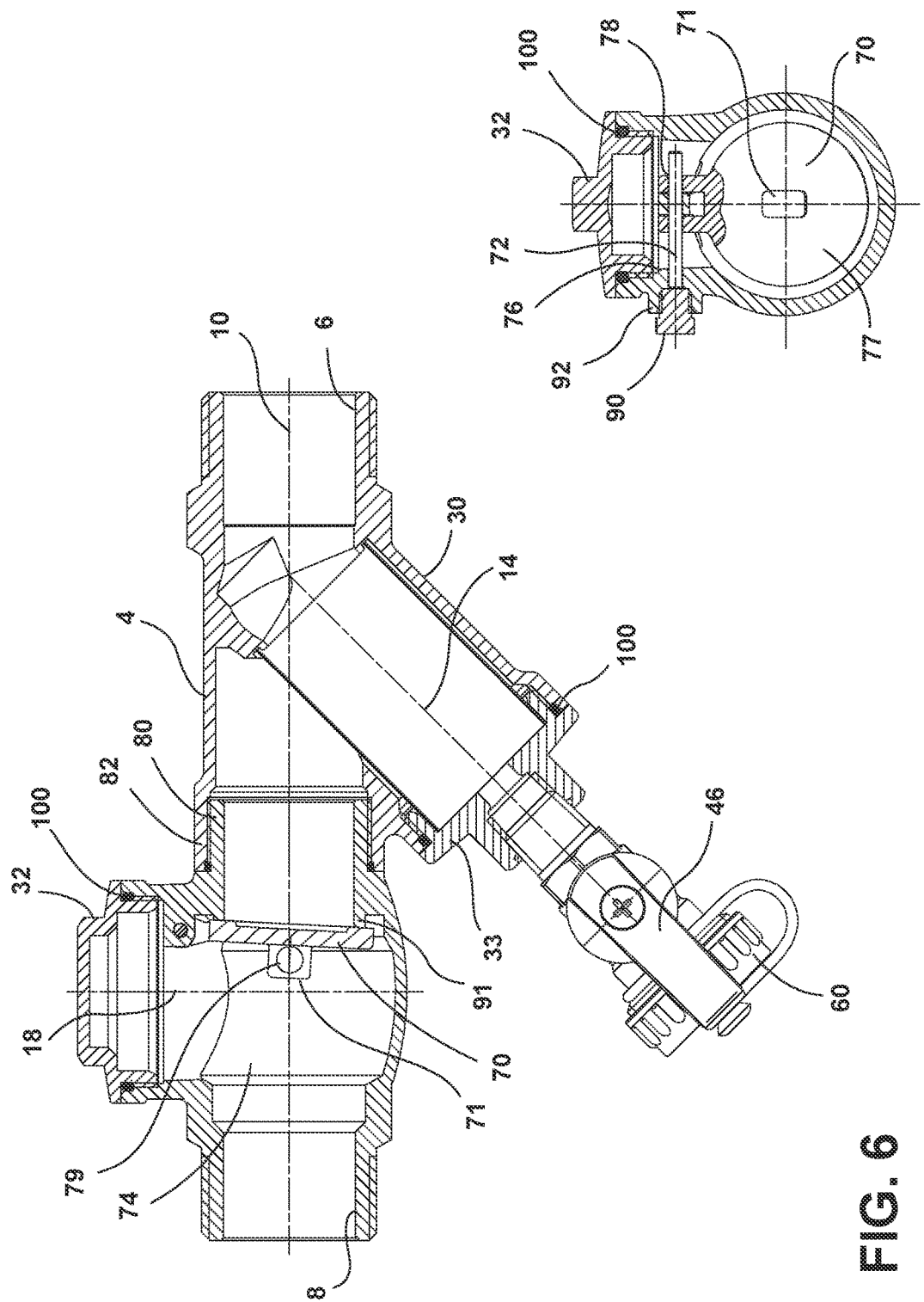

SERVICEABLE SWING CHECK VALVE WITH INTEGRATED STRAINER AND REMOVABLE DRAIN

BACKGROUND OF THE INVENTION

The present invention relates to a serviceable swing check valve with assembly that can be used in plumbing systems. Swing check valves have a disk that will swing to allow fluid flow in one direction. Pressure in the fluid swings the disk to an open position. When the pressure drops, the disk will swing back to a closed position. This limits the backflow in the plumbing system adjacent to the swing check valve. Debris in the fluid can cause the swing check valve to get stuck in an open, closed, or intermediate position. Thus, maintenance and/or replacement of a swing check valve may be required. This typically requires removal and replacement of the entire swing check valve assembly from the system.

Thus, a serviceable swing check valve assembly that screens debris from the fluid before it reaches the swing check valve disk and allows for the replacement of the disk without the removal of the entire swing check valve assembly would be advantageous.

SUMMARY OF THE INVENTION

One aspect of the present invention is a swing check valve. The swing check valve has a valve body with a fluid passageway between a first port, a second port, and a drain section. A swing check valve member is positioned in a swing check cavity in the valve body between the first port and second port. A strainer is positioned within the fluid passageway between the first port and swing check valve member. An access port is positioned on the valve body adjacent to the swing check cavity. The swing check valve also has a valve member in the drain section.

Another aspect of the present invention is a swing check valve assembly. The valve body has a first port, a second port, a drain section, an access port, a deflector, and a swing check cavity. A swing valve member is positioned in the swing check cavity. A strainer is positioned in the valve body adjacent to the deflector. A cap is coupled to the drain section, and a valve member coupled to the cap.

Yet another aspect of the present invention is a valve assembly. The valve assembly has a valve body with a first port, a second port, a drain section, an access port, and a deflector. The first port is positioned opposite the second port along a first centerline. The drain section has a second centerline that is positioned at an angle to the first centerline. The access port has a third centerline that is perpendicular to the first centerline. A strainer is positioned in the drain section with a portion of the strainer contacting the deflector. A cap is coupled to the drain section.

These and other features, advantages, and objects of the present invention will be further understood and appreciated by those skilled in the art by reference to the following specification, claims, and appended drawings.

BRIEF DESCRIPTION OF THE DRAWINGS

FIG. 6 is a side cross-sectional view of a swing check valve assembly with different fitting ends;

FIG. 7 is a cross-sectional view of the check valve portion of the swing check valve assembly;

FIG. 20 is a partial side cross-sectional view of the swing check valve disk show in in

FIG. 19;

DETAILED DESCRIPTION

For purposes of description herein, the terms "upper," "lower," "right," "left," "rear," "front," "vertical," "horizontal," and derivatives thereof shall relate to the invention as oriented in Figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
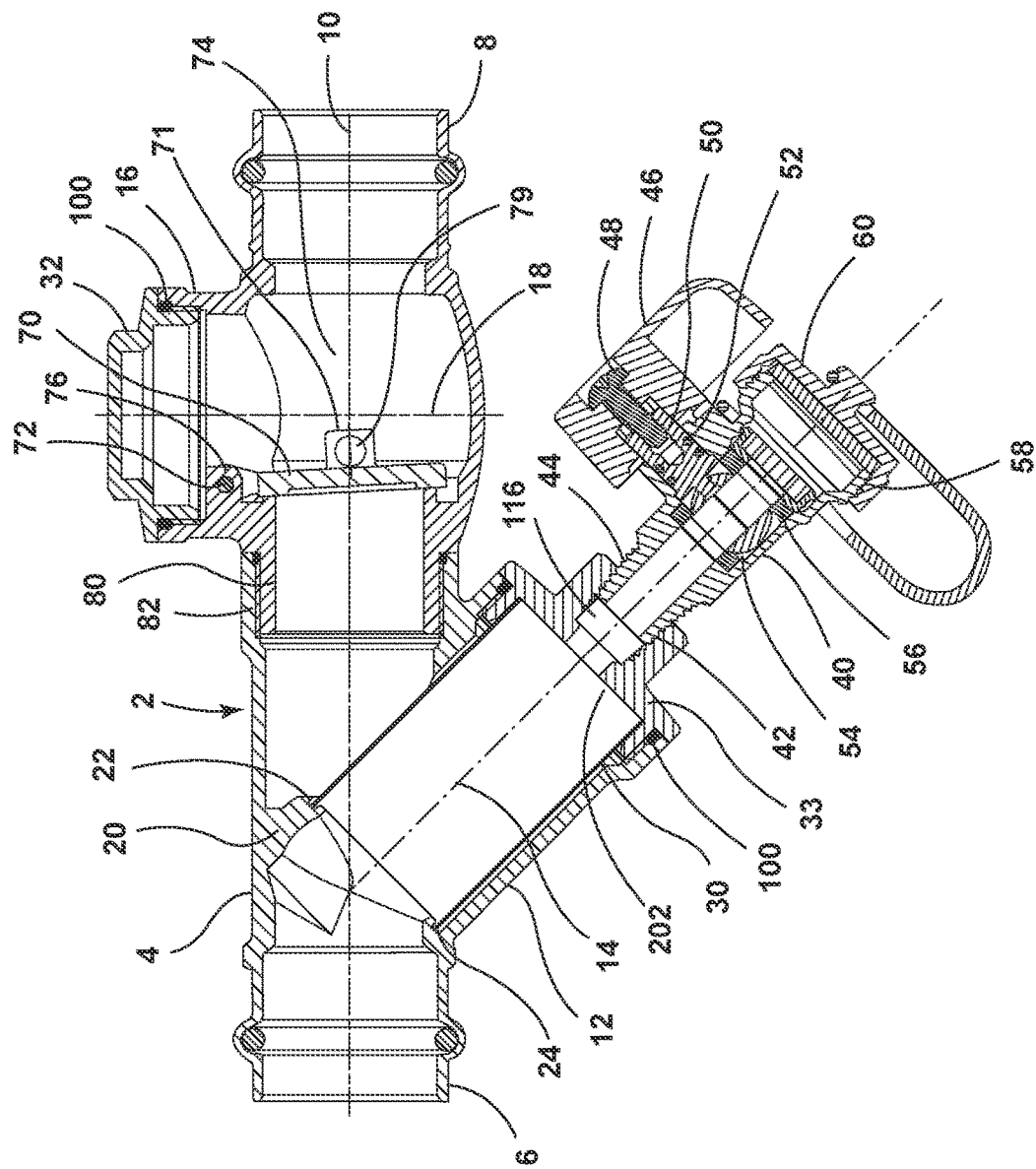
FIG. 3 is a side cross-sectional view of the swing check valve assembly show in FIG. 1.
Figure 5:
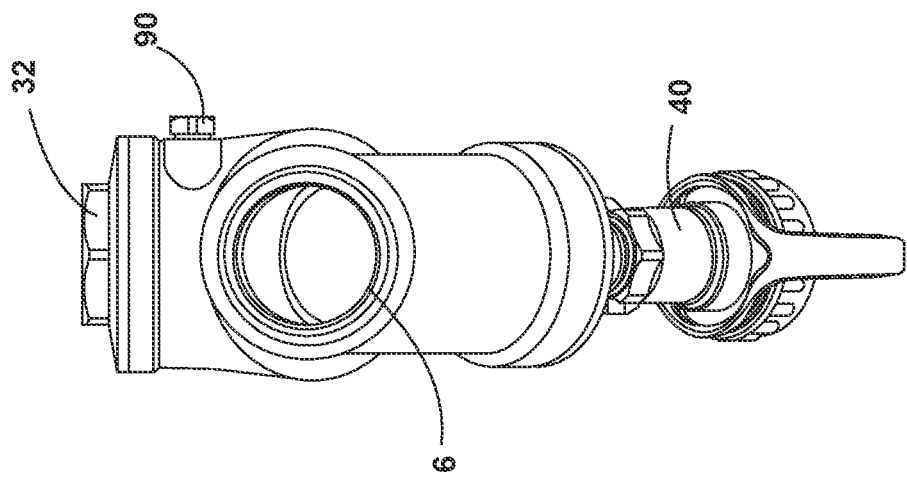
FIG. 5 is a front view of the swing check valve assembly shown in FIG. 1.
Figure 4:
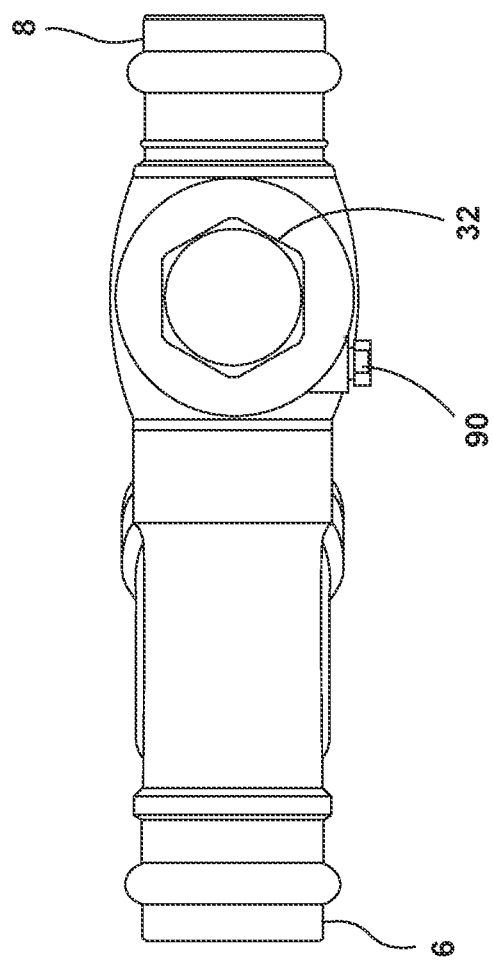
FIG. 4 is a top view of the swing check valve assembly shown in in FIG. 1.
Figure 9:
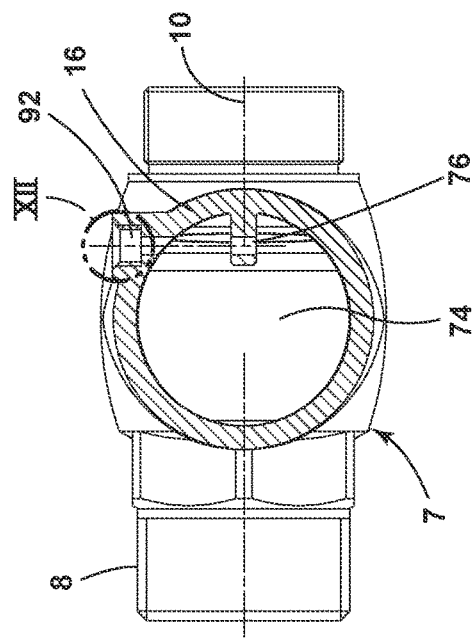
FIG. 9 is a partial top cross-sectional view of the swing check valve cavity and swing check valve.
Figure 8:
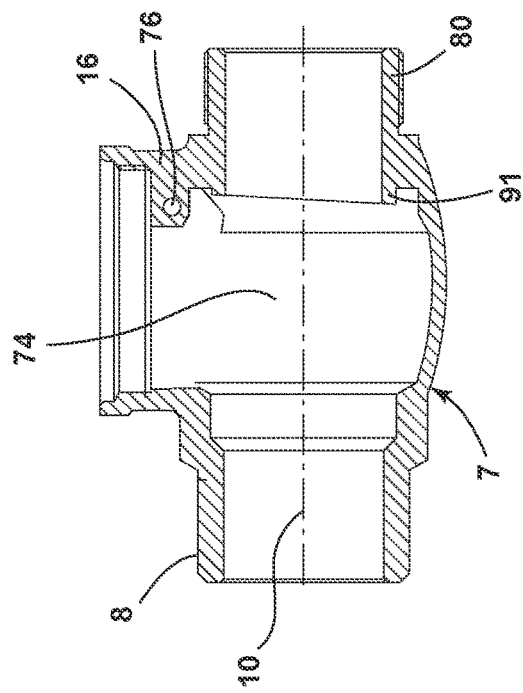
FIG. 8 is a side cross-sectional view of the swing check cavity of the swing check valve assembly.
Figure 10:
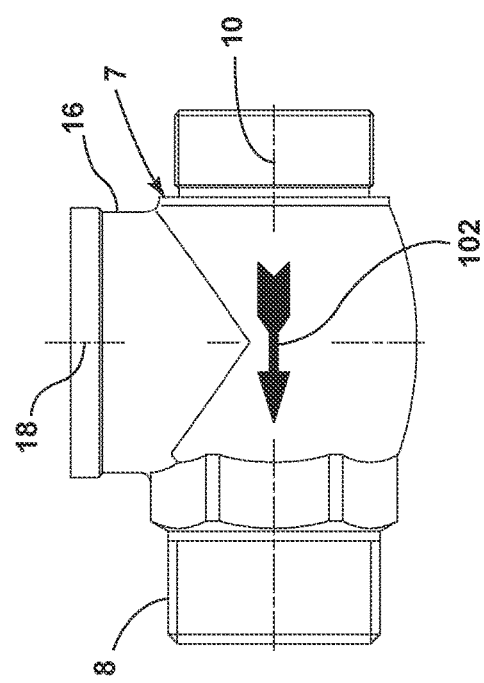
FIG. 10 is a side view of the swing check cavity portion of the swing check valve assembly.
Figure 11:
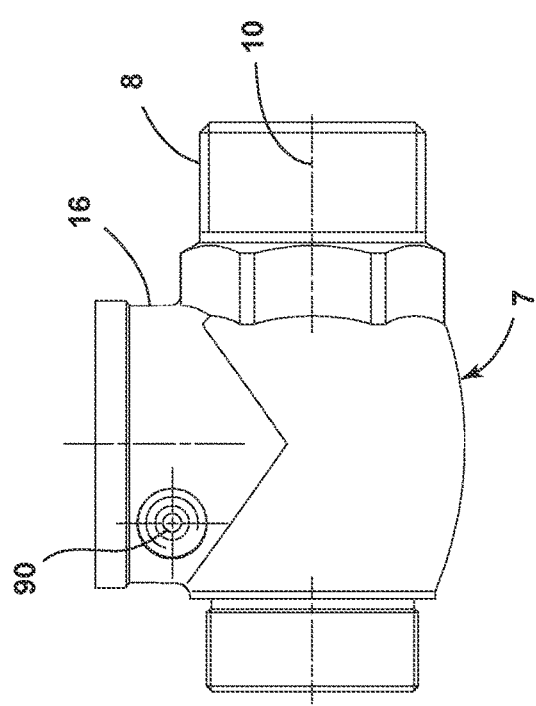
FIG. 11 is a side view of the swing check cavity portion of the swing check valve assembly.
Figure 13:
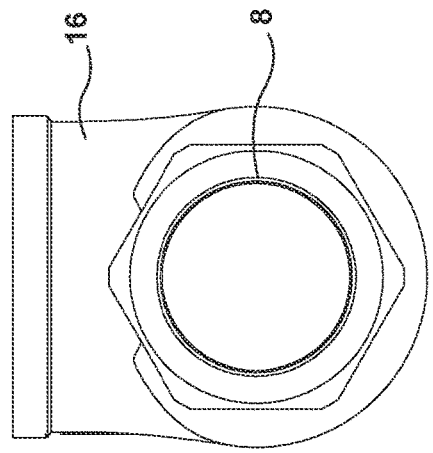
FIG. 13 is a rear view of the swing check cavity portion shown in FIG. 11.

A swing check valve assembly 2 is illustrated in FIGS. 1-6, 24, and 26. The swing check valve assembly 2 has a valve body 4 with a first port 6 and a second port 8. The first port 6 and the second port 8 are illustrated as being positioned opposite each other on the valve body 4 with the fluid passageway having a first centerline 10 extending between the first port 6 and the second port 8. The valve body 4 also has a drain section 12. The drain section 12 has a second centerline 14 that is positioned at an angle to the first centerline 10. The valve body 4 also has an access port 16. The access port 16 has a third centerline 18 that is positioned generally perpendicular to the first centerline 10 as illustrated in FIG. 3.

The access port 16 is illustrated as being a raised boss on the valve body 4. However, the access port 16 could be any opening in the valve body 4. An access cap 32 is coupled to the access port 16. Removal of the access cap 32 permits access to a swing check cavity 74. In the illustrated embodiments, the access port 16 and the swing check cavity 74 are located adjacent to the second port 8 of the valve body 4.

Figure 14:
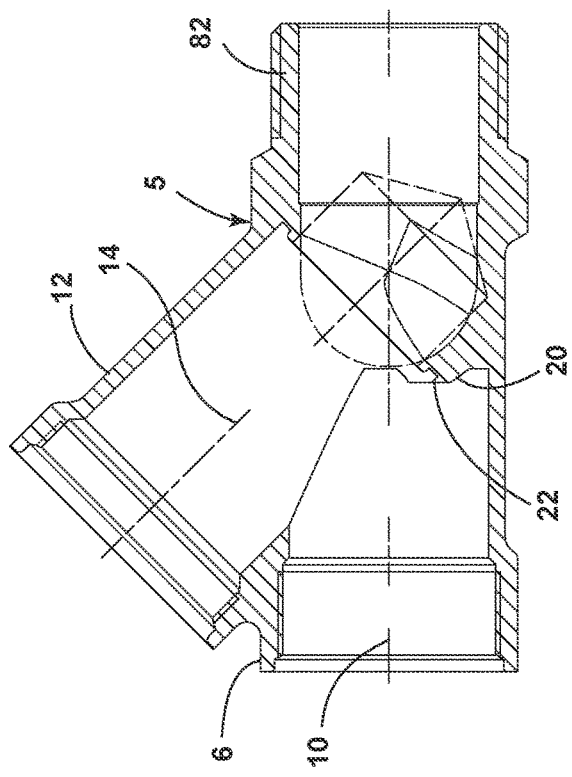
FIG. 14 is a side cross-sectional view of the first port and drain section of the valve body.
Figure 16:
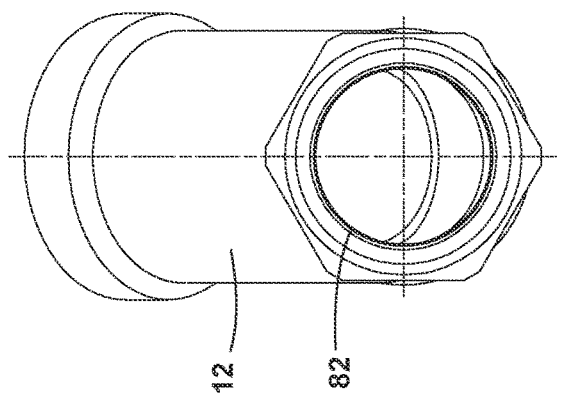
FIG. 16 is a front view of the first port and drain section shown in FIG. 14.
Figure 15:
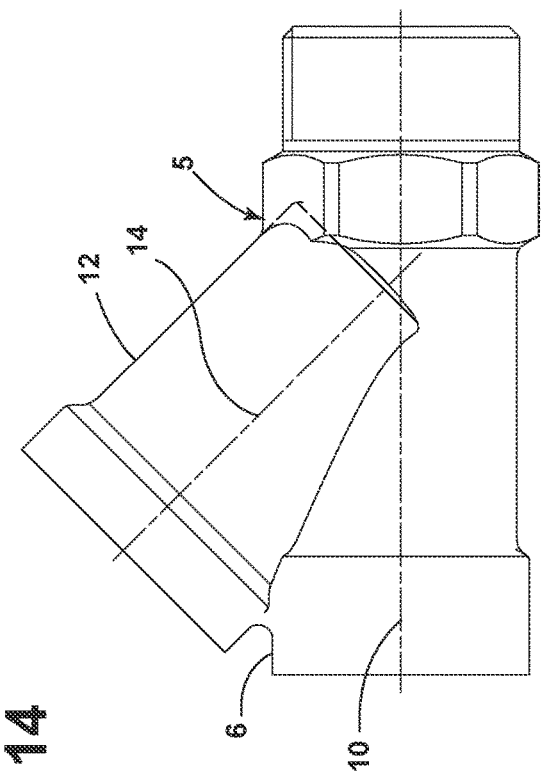
FIG. 15 is a side view of the first port and drain section shown in FIG. 14.
Figure 18:
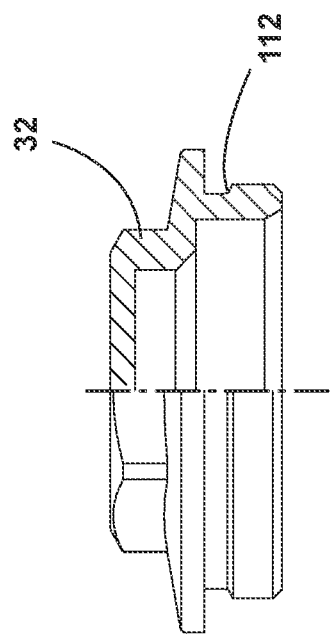
FIG. 18 is a partial cross-sectional view of the access port cap.
Figure 17:
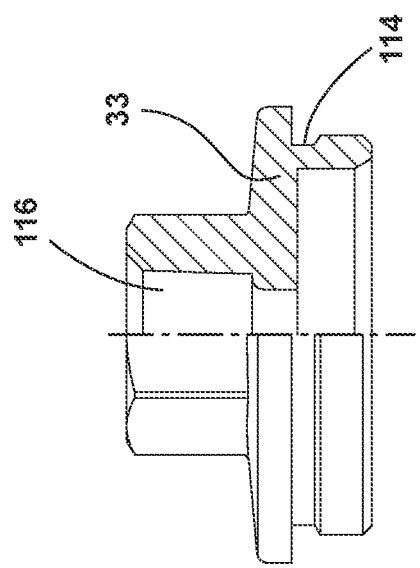
FIG. 17 is a partial cross-sectional view of the drain section cap.
Figure 24:
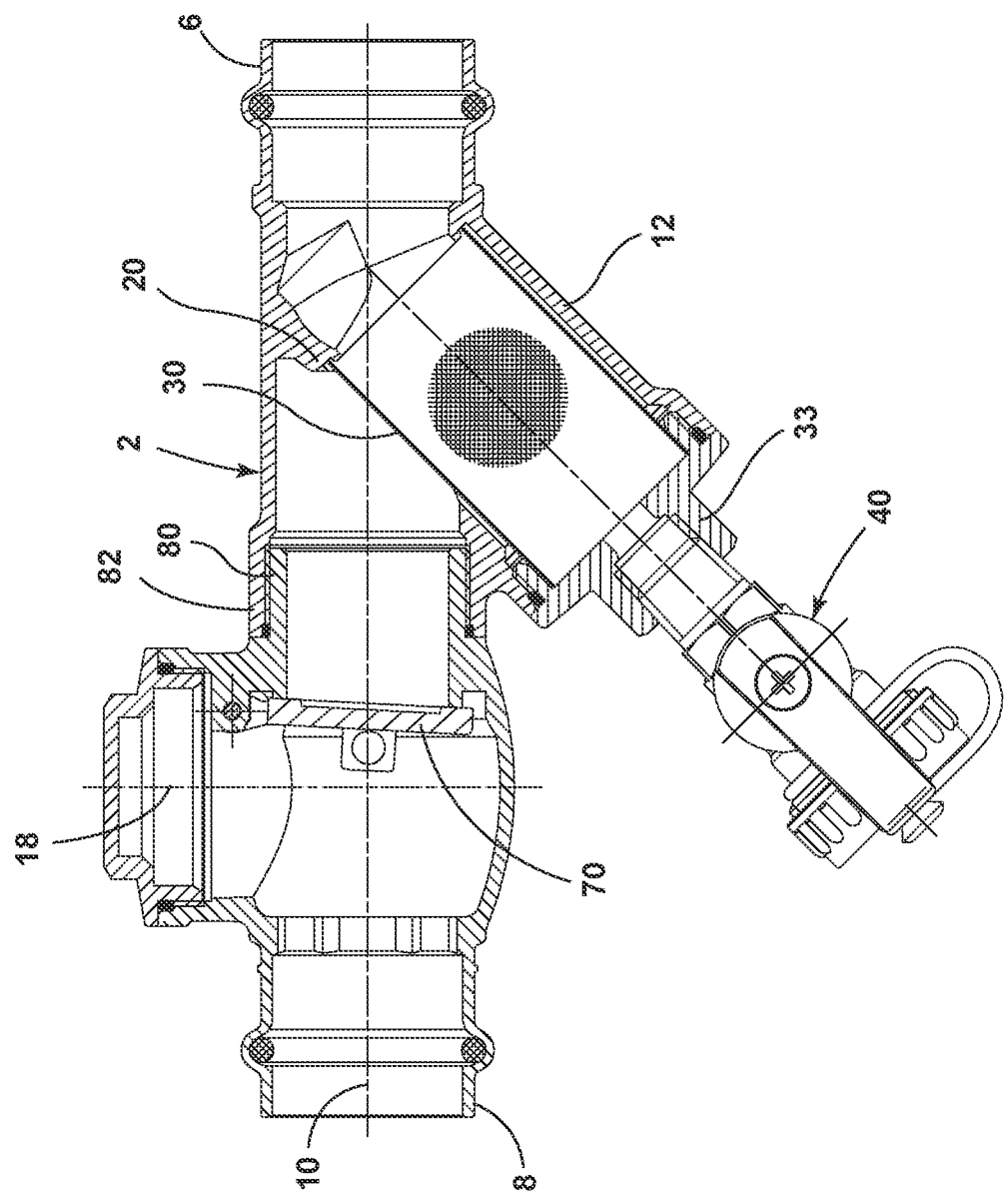
FIG. 24 is a rotated partial side cross-sectional view of another swing check valve assembly.

The valve body 4 can be a unitary piece or multiple pieces. In the embodiments illustrate in FIGS. 3, 6 and 24, the valve body 4 includes a first section 5 (illustrated in FIGS. 14-16) and a second section 7 (Illustrated in FIGS. 8-11) that are coupled together. The first section 5 includes the first port 6 and the drain section 12, while the second section 7 includes the swing check cavity 74 and the second port 8. The first section 5 and second section 7 are coupled by overlapping sections 80 (on the second section 7) and 82 (on the first section 5) as illustrated in FIGS. 3, 6, and 24. If multiple pieces are used, they can be coupled together by threading, adhesive, or any other type of coupling.

The valve body 4 also includes a deflector 20 that is positioned within the fluid passageway between the first port 6 and second port 8. The deflector 20 includes a first strainer groove 22 as illustrated in FIG. 3. A second strainer groove 24 can also be positioned on the valve body 4 adjacent to the drain section 12. A strainer 30 is positioned within the drain section 12. A portion of the strainer 30 can be received within the first strainer groove 22 and second strainer groove 24. The strainer 30 is made of a polymeric and/or metal mesh. The strainer 30 will filter debris from the fluid entering from the first port 6. The filter fluid is then allowed to pass through section 200 of the strainer 30 towards the second port 8. The debris is then collected at the bottom end 202 of the drain section 12.

Figure 21:
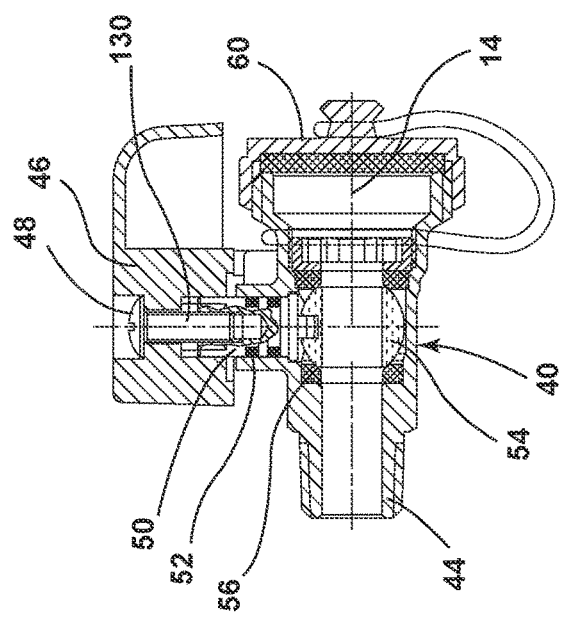
FIG. 21 is a side cross-sectional view of the drain valve assembly.
Figure 23:
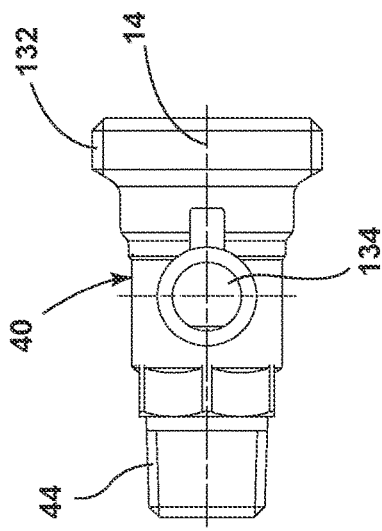
FIG. 23 is a top view of the valve body shown in FIG. 22.

A valve assembly 40 is coupled to the drain section cap 33. The valve assembly 40 includes a section 44 that is received within opening 116 in the drain section cap 33. The section 44 can be in threaded engagement with opening 116 or can otherwise be coupled to opening 116, including, but not limited to the use of adhesive of other bonding materials. The valve assembly 40 includes a flow diversion member 54 positioned within the drain path of the valve assembly 40. In the illustrated embodiment shown in FIG. 3, the flow diversion member 54 is a ball. Seals 56 are positioned around the flow diversion member 54. The valve assembly 40 includes a handle 46 that is coupled to a stem 50. The stem 50 can be surrounded by stem seals 52 to help seal the stem 50 within stem opening 134 in the valve assembly 40. A drain port 132 is positioned on the valve assembly 40 and can be releasably sealed by cap 60. A fastener 48 can be used to secure the handle 46 to the stem 50. The centerline 130 of the stem 50 is perpendicular to the second centerline 14 as illustrated in FIG. 21.

Figure 12:
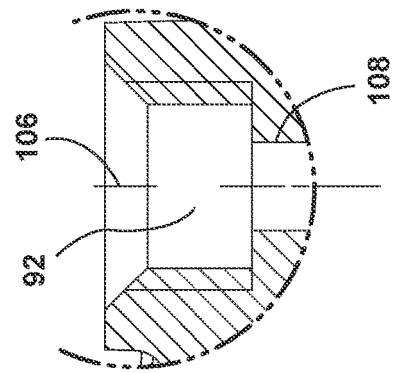
FIG. 12 is a partial cross-sectional view of the pin cavity on the valve body.
Figure 20:
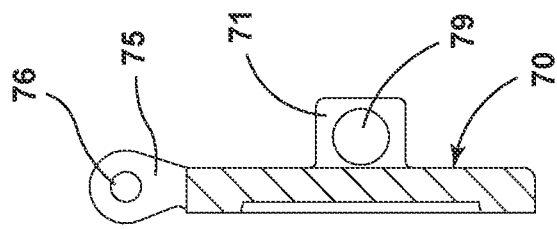
Figure 19:
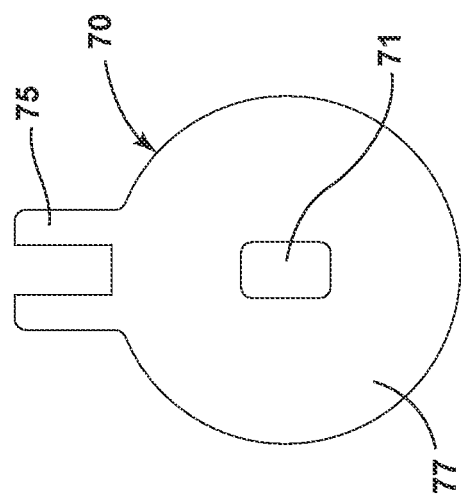
FIG. 19 is a front view of the swing check valve disk.
Figure 22:
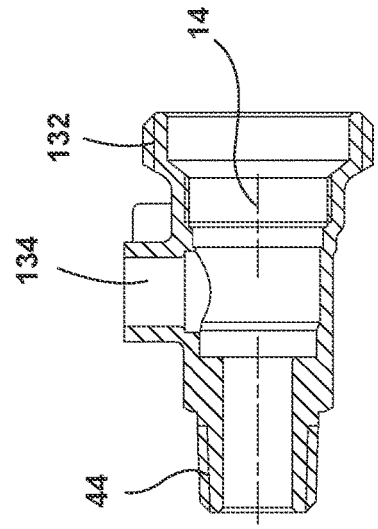
FIG. 22 is a side cross-sectional view of the valve body of the drain valve assembly shown in FIG. 21.

A swing check valve member 70 is coupled to the valve body 4. The swing check valve member 70 has a disc section 77 with one or more arms 75. The arms 75 have a pin opening 76 through which a pin 72 is received. The disc section 77 can have a protrusion 71 with an opening 79 as illustrated in FIGS. 3, 6, and 20. The swing check valve member 70 is coupled to the valve body 4 by insertion of pin 72 through opening 92 in the valve body 4. The opening 92 includes a plug section 106 and a pin section 108 as illustrate in FIG. 12. A plug 90 can be inserted into the plug section 106 to secure the pin 72 within the pin section 108 and the pin opening 76 of the swing check valve member 70.

The swing check valve member 70 is positioned in the swing check cavity 74 portion of the fluid passageway between the first port 6 and second port 8. The swing check valve member 70 is positioned to permit flow toward the second port 8. When the fluid pressure is higher on the first port 6 side of the disc section 77, the disc section 77 will rotate around pin 72 towards the access cap 32. When the fluid pressure is lower on the first port 6 side of the disc section 77, the disc section 77 will close and contact surface 91 of the valve body 4. The swing check valve member 70 thus restricts the flow of fluid from the second port 8 towards the first port 6. If the fluid pressure is greater on the second port side of the disc section 77, the disc section 77 will close.

Figure 25:
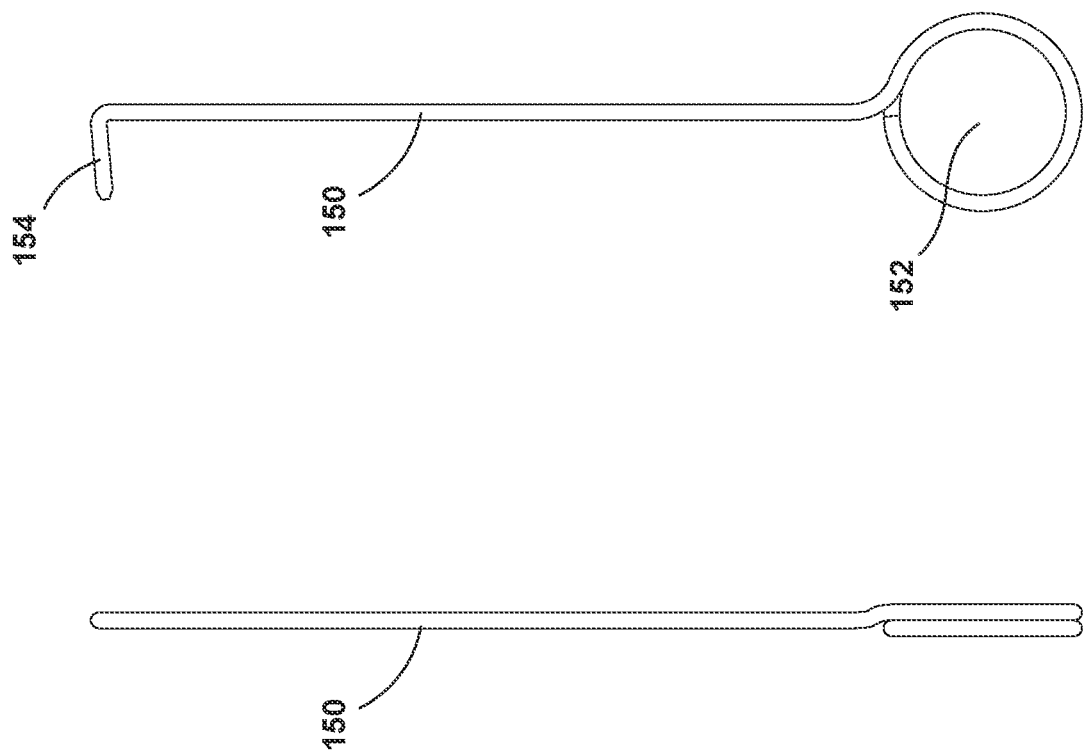
FIG. 25 is a top and side view of a tool for removing the swing check valve from the swing check valve assembly.
Figure 26:
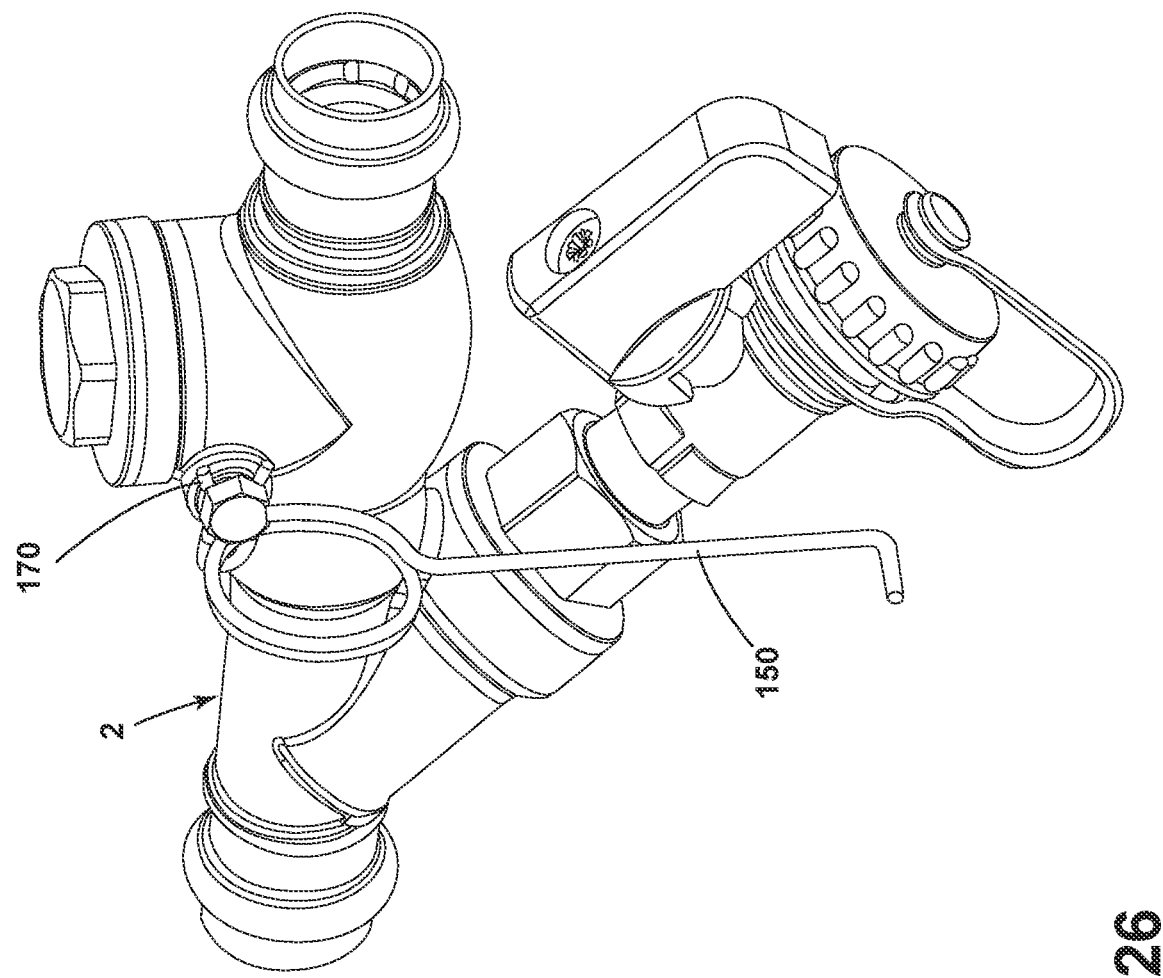
FIG. 26 illustrates the attachment of the tool shown in FIG. 25 to a swing check valve assembly.
Figure 27:
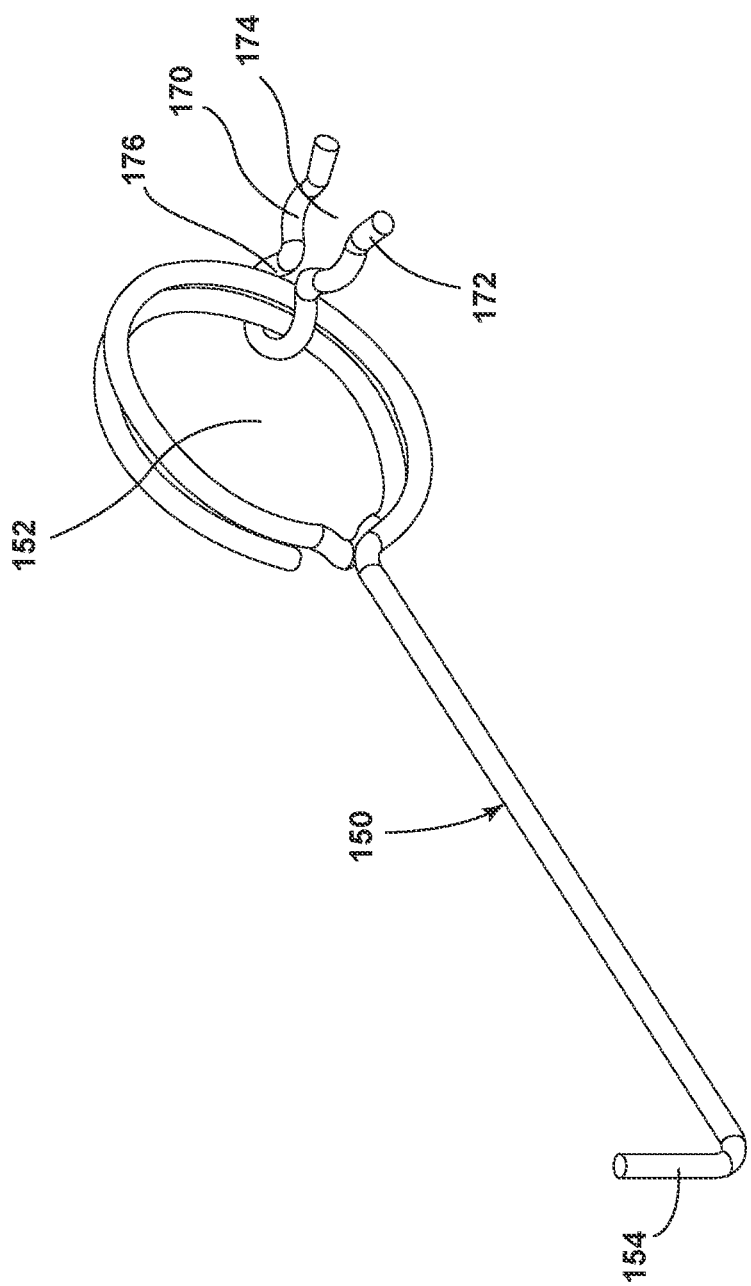
FIG. 27 is a rotated side view of the tool shown in FIG. 25 with an optional clip.

Removal of the access cap 32 from the access port 16 allows the servicing, cleaning, and/or replacement of the swing check valve member 70. A tool 150 (shown in FIGS. 25-27) can be coupled to the valve body 4 by use of mounting clip 170. The mounting clip 170 includes a section 176 that is received around a loop section 152 of tool 150. A pair of opposed arms 172 on the tool 150 form a gap 174 that can be coupled to a portion of valve body 4 as illustrated in FIG. 26. Hook section 154 of tool 150 can be received in opening 79 on swing check valve member 70 to raise the swing check valve member 70 out of the access port 16 after the plug 90 and pin 72 have been removed from the swing check valve assembly 2.

The swing check valve assembly 2 will strain debris from the incoming fluid supply coupled to the first port 6 before the fluid reaches the swing check valve member 70. When the filtered debris has accumulated, the valve assembly 40 can be opened and the cap 60 removed to flush the accumulated debris out of the swing check valve assembly 2. In addition, the drain section cap 33 can be removed from the drain section 12 to permit the serving, cleaning, and/or replacement of the strainer 30.

The coupling of the drain section cap 33 and the access cap 32 to the valve body 4 can be by threaded engagement or other coupling methods. In addition, O-rings 100 can be utilized to help seal the drain section cap 33 and the access cap 32 to the valve body 4.

Figure 1:
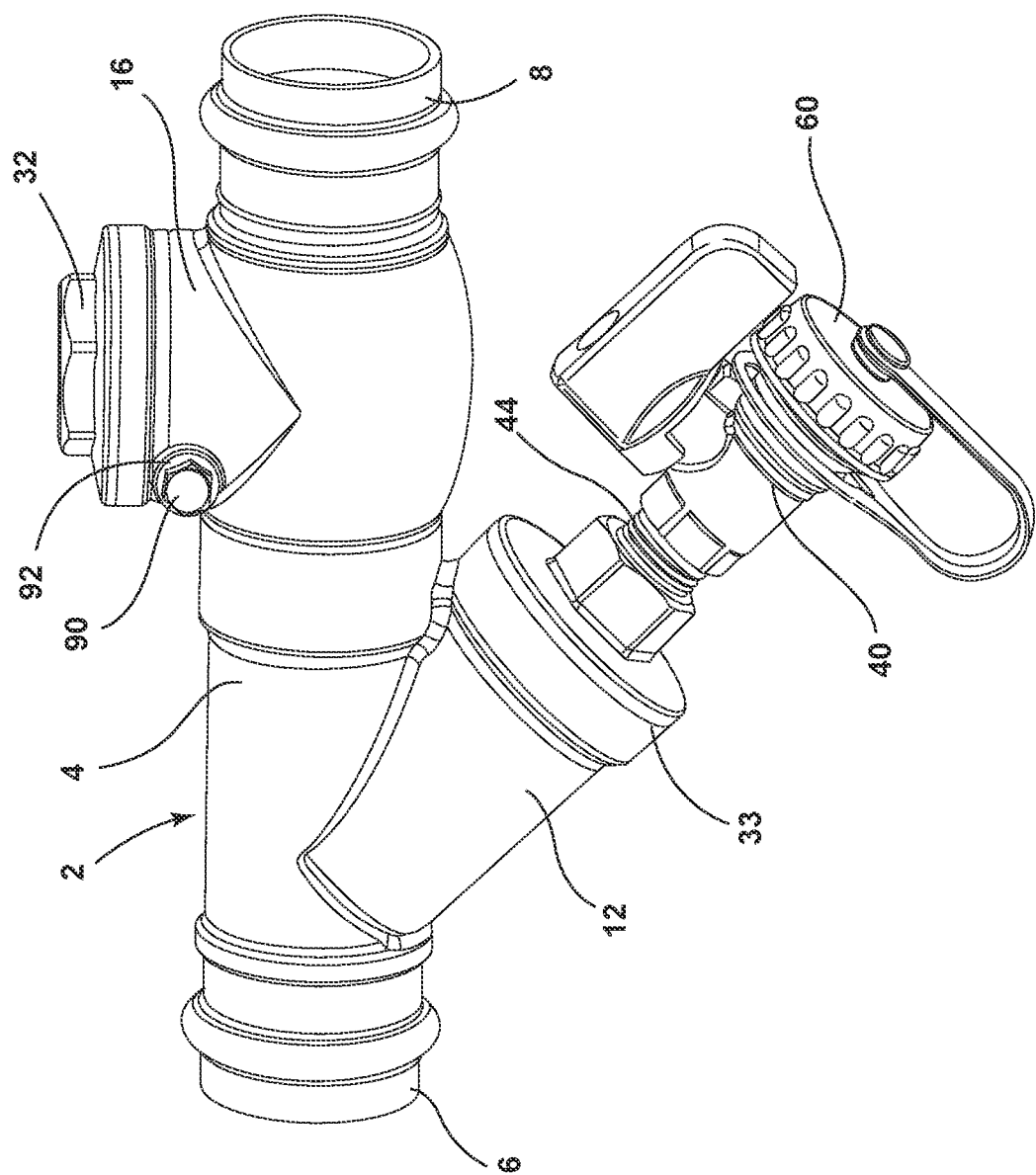
FIG. 1 is a side perspective view of a swing check valve assembly with press fitting ends.
Figure 2:
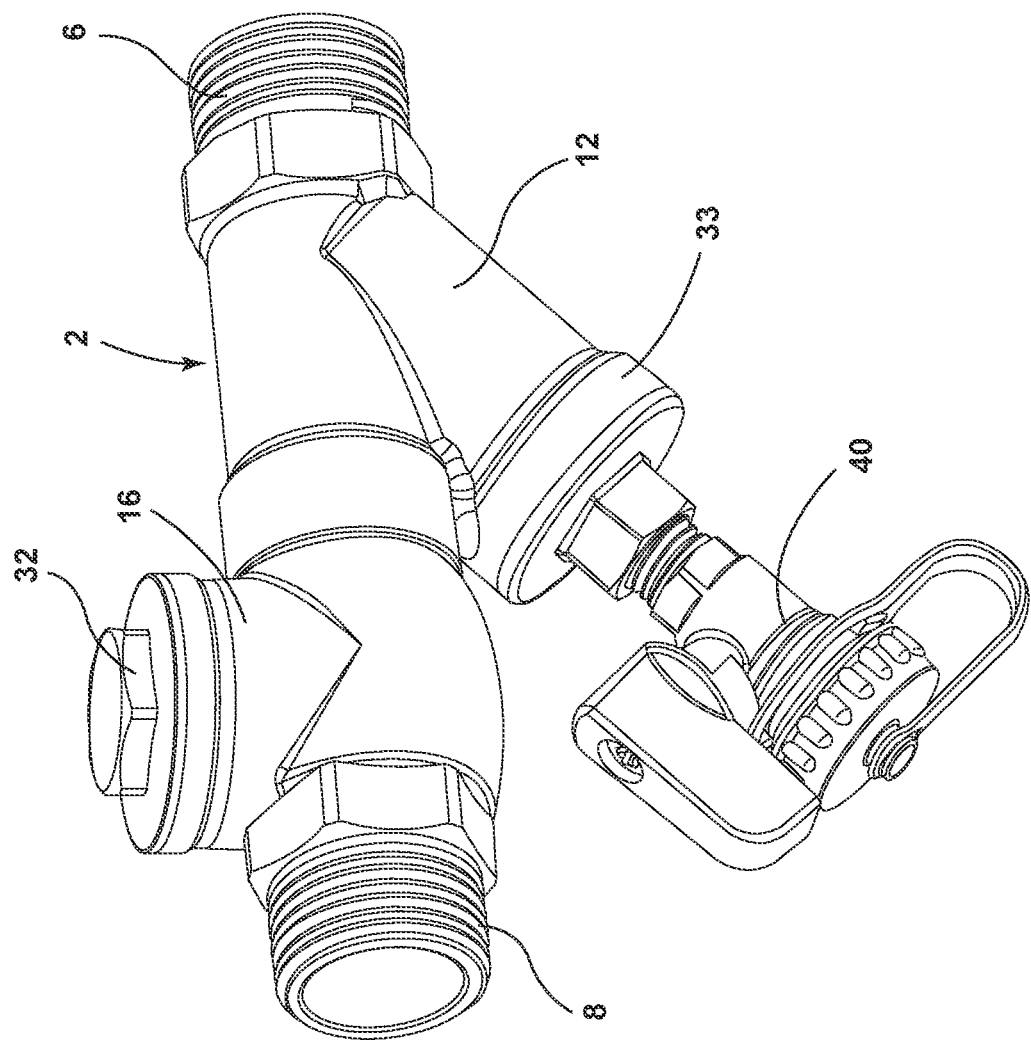
FIG. 2 is a rotated side perspective view of another swing check valve assembly with different fitting ends.

The illustrated embodiment of FIGS. 1, 3, and 26 illustrate the first port 6 and the second port 8 as having press-fitting ends. However, the first port 6 and second port 8 can have any type of fitting end, including PEX, FIP, MIP, seat, push-to-connect, union, PPR, etc. The fitting ends for the first port 6 and second port 8 can be the same or could be different size and/or different type of fifty ends.

The valve body 4 may be made from any type of high strength material including polymeric and metal materials. In the illustrated embodiment, the valve body 4 is made from a dezincification brass. The swing check cavity 74 of the valve body 4 can include one or more dampening surfaces for cushioning the engagement of the swing check valve member 70 against surfaces of the valve body 4. The dampening surfaces may include coatings, polymeric inserts, and/or shaped surfaces of the valve body 4 to dampen the contact of the swing check valve member 70. In addition, the swing check valve member 70 can have dampening surfaces to limit damage to the check valve member 70.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A swing check valve, comprising:
   a valve body having a fluid passageway between a first port, a second port, and a drain section;
   a swing check valve member positioned in a swing check cavity in said valve body adjacent to said second port, said swing check valve member swinging toward said second port when said swing check valve member rotates from a closed position;
   a strainer positioned within said fluid passageway between said first port and said swing check valve member, said strainer contacting opposed strainer grooves on said valve body;
   an access port positioned on said valve body adjacent to said swing check cavity;
   a valve member on said drain section; and
   wherein said strainer include a portion that extends into said drain section.

2. The swing check valve of claim 1, wherein said first port and said second port are positioned on opposite ends of said valve body, with said drain section being positioned adjacent to said first port at a non-perpendicular angle with respect to said first port and said second port.

3. The swing check valve of claim 1, wherein said strainer extends up into the fluid passageway adjacent to said first port.

4. The swing check valve of claim 1, wherein said valve body includes a deflector positioned in said fluid passageway adjacent to the first port.

5. The swing check valve of claim 4, wherein one of said strainer grooves is on a deflector.

6. The swing check valve of claim 1, wherein said valve member is positioned on an insert that is coupled to said drain section.

7. The swing check valve of claim 1, wherein said access port is in a raised boss on said valve body.

8. The swing check valve of claim 1, wherein said valve body is a single piece.

9. A swing check valve assembly, comprising:
   a valve body with a first port, a second port, a drain section positioned at a non-perpendicular angle with respect to said first port, an access port, opposed strainer grooves, and a swing check cavity adjacent to said second port;
   a swing check valve member positioned in said swing check cavity, said swing check valve member swinging toward said second port when said swing check valve member rotates from a closed position;
   a strainer positioned in said valve body in contact with said opposed strainer grooves;
   a cap coupled to said drain section;
   a valve member coupled to said cap; and
   wherein one of said strainer grooves is on a deflector positioned adjacent to said first port.

10. The swing check valve assembly of claim 9, wherein said strainer extends into said drain section.

11. The swing check valve assembly of claim 9, wherein said access port is in a raised boss on said valve body.

12. The swing check valve assembly of claim 9, including a threaded cap coupled to said access port.

13. A valve assembly, comprising:
a valve body with a first port, a second port, a drain section, an access port adjacent to said second port, and opposed strainer grooves, with at least one of said strainer grooves being on a deflector positioned adjacent to said first port;
   wherein said first port is positioned opposite said second port along a first centerline;
   wherein said drain section has a second centerline that is positioned at a non-perpendicular angle to said first centerline;
   wherein said access port has a third centerline that is perpendicular to said first centerline;
a swing check valve member positioned in a swing check cavity in said valve body, said swing check valve member swinging toward said second port when said swing check valve member rotates from a closed position;
a strainer positioned in said drain section between said first port and said swing check valve member; and
a cap coupled to said drain section.

14. The valve assembly of claim 13, wherein said swing check cavity is positioned on said valve body below said access port.

15. The valve assembly of claim 13, includes a valve assembly coupled to said cap.

16. The valve assembly of claim 13, wherein said opposed strainer grooves are two spaced-apart grooves.

17. The valve assembly of claim 13, including a tool coupled to said valve body by a mounting clip.

18. The valve assembly of claim 13, wherein said valve body is a single piece.

19. The valve assembly of claim 13, wherein said valve body is multiple pieces.

* * * * *